(12) United States Patent
Le Moigne et al.

(10) Patent No.: US 9,358,834 B2
(45) Date of Patent: Jun. 7, 2016

(54) BACKING DEVICE, AXLEBOX, VEHICLE AND METHODS FOR MOUNTING AND DISMOUNTING SUCH A BACKING DEVICE

(71) Applicants: Thierry Le Moigne, Luynes (FR); Arnaud Turmeau, Mallisard (FR)

(72) Inventors: Thierry Le Moigne, Luynes (FR); Arnaud Turmeau, Mallisard (FR)

(73) Assignee: AKTIEBOLAGET SKF, Gothenburg (SE)

( * ) Notice: Subject to any disclaimer, the term of this patent is extended or adjusted under 35 U.S.C. 154(b) by 15 days.

(21) Appl. No.: 14/554,356

(22) Filed: Nov. 26, 2014

(65) Prior Publication Data

US 2015/0151575 A1    Jun. 4, 2015

(30) Foreign Application Priority Data

Nov. 26, 2013   (EP) .................................... 13194496

(51) Int. Cl.

| | | |
|---|---|---|
| *B60B 27/02* | (2006.01) | |
| *B60B 27/00* | (2006.01) | |
| *B61F 15/20* | (2006.01) | |
| *F16C 35/063* | (2006.01) | |
| *B61F 5/30* | (2006.01) | |
| *F16C 33/80* | (2006.01) | |
| *F16C 19/54* | (2006.01) | |

(52) U.S. Cl.
CPC ............. *B60B 27/0078* (2013.01); *B61F 5/305* (2013.01); *B61F 15/20* (2013.01); *F16C 35/063* (2013.01); *B60B 2320/10* (2013.01); *F16C 19/54* (2013.01); *F16C 33/80* (2013.01); *Y10T 29/49822* (2015.01); *Y10T 29/49863* (2015.01)

(58) Field of Classification Search
CPC ....... B60B 27/0078; B61F 5/305; B61F 5/30; B61F 5/28; B61F 5/26; B61F 15/00; B61F 15/12; B61F 15/20; B61F 15/22; B61F 15/26; F16C 35/04; F16C 35/06; F16C 35/063; F16C 35/0635; F16C 35/07
USPC .................................................... 301/109, 110
See application file for complete search history.

(56) References Cited

U.S. PATENT DOCUMENTS

| | | | | |
|---|---|---|---|---|
| 3,395,956 A | * | 8/1968 | Fisher ................. | F16C 33/6622 384/559 |
| 3,741,614 A | * | 6/1973 | Judge .................... | F16C 19/548 384/459 |
| 3,807,820 A | * | 4/1974 | Schuhmann .......... | F16C 35/073 384/538 |
| 4,576,503 A | * | 3/1986 | Orain .................. | B60B 27/0005 384/267 |

(Continued)

FOREIGN PATENT DOCUMENTS

| | | |
|---|---|---|
| FR | 93444 E | 3/1969 |
| FR | 2537678 A1 | 6/1984 |
| GB | 1393417 A | 5/1975 |

*Primary Examiner* — John Walters
(74) *Attorney, Agent, or Firm* — Bryan Peckjian; SKF USA Inc. Patent Dept.

(57) ABSTRACT

A backing device, adapted to equip an axlebox comprising a bearing unit and supporting an axle. The backing device comprises: (a) an inner ring having an inner surface and at least one outer surface; (b) at least one outer ring having an inner surface facing the outer surface of the inner ring; and (c) a tightening component inserted inside at least one of the inner ring and the outer ring. When actuated, the tightening component presses the inner surface of the outer ring and the outer surface of the inner ring against each other and narrow the inner surface of the inner ring by elastic deformation thereof. The axlebox can be integrated into a vehicle. Mounting and dismounting methods are described herein.

15 Claims, 5 Drawing Sheets

(56) References Cited

U.S. PATENT DOCUMENTS

| | | |
|---|---|---|
| 5,489,156 A | 2/1996 | Martinie |
| 7,093,981 B2 * | 8/2006 | Masui ............... F16C 19/48 384/498 |
| 7,219,938 B2 * | 5/2007 | Brister ............... B61F 15/22 295/42 |
| 2005/0052043 A1 | 3/2005 | Brister et al. |

* cited by examiner

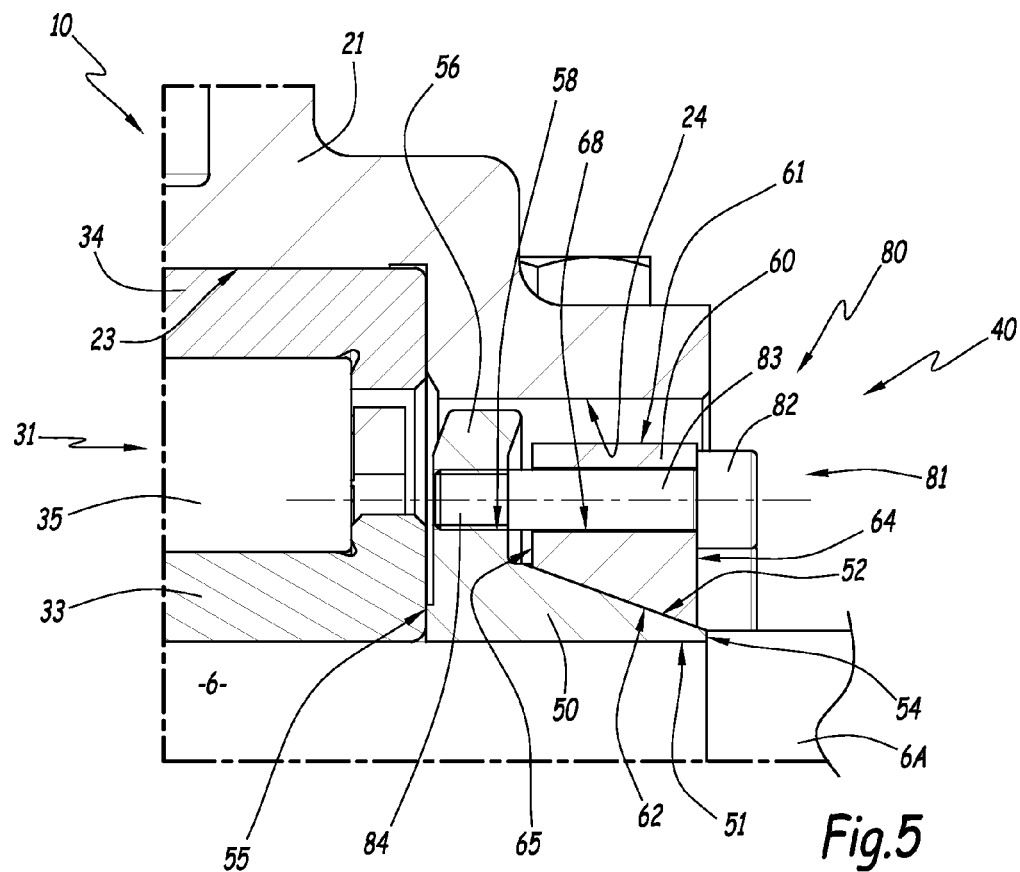
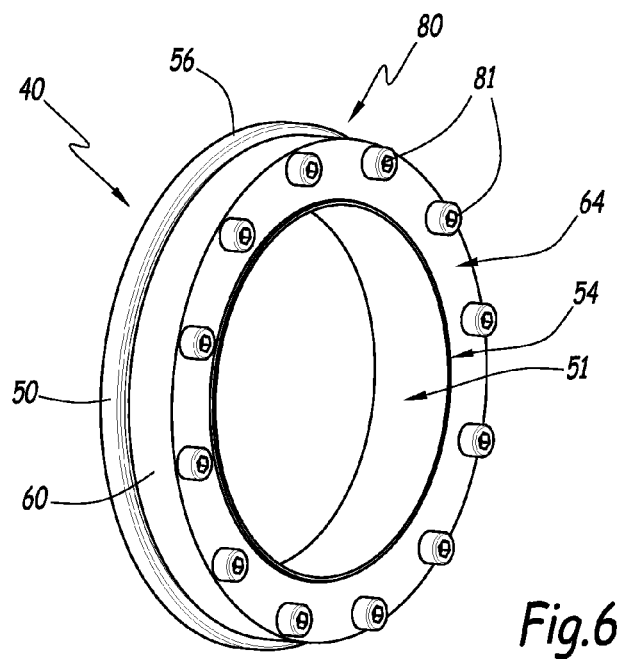

BACKING DEVICE, AXLEBOX, VEHICLE AND METHODS FOR MOUNTING AND DISMOUNTING SUCH A BACKING DEVICE

CROSS REFERENCE TO RELATED APPLICATION

This is a National Stage application claiming the benefit of European Union Patent Application Number EP13194496 filed on 26 Nov. 2013 (26.11.2013), which is incorporated herein by reference in its entirety.

TECHNICAL FIELD OF THE INVENTION

The invention concerns a backing device, adapted to equip an axlebox comprising a bearing unit and supporting an axle. The invention also concerns an axlebox comprising such a backing device and a vehicle comprising such an axlebox. The invention also concerns methods for mounting and dismounting such a backing device.

BACKGROUND OF THE INVENTION

Axleboxes mounted on railway vehicles, such as trains, passenger coaches and freight cars, are the linking design elements between a rotating wheelset and the quasi-static frame of a bogie. An axlebox comprises a housing receiving a bearing unit.

Furthermore, it is known to provide an axlebox with a device for backing the bearing unit mounted on the axle. Typically, the backing device has an annular shape and is mounted around the axle, between the bearing unit and an abutment formed on the axle. The backing device performs a mechanical connection between the axle and the bearing unit. The abutment is designed with a vertical face and a round shape in connection with the diameter of the bearing unit, in order to avoid stress concentration. The backing device is designed to equally distribute the pressure coming from the bearing unit and axial forces to the abutment. To avoid micro displacement and fretting, the backing device is generally press fitted on the axle. Preferably, the backing device associated with the axlebox housing or a rear cover has a special shape for ensuring sealing between the bearing unit and the external environment of the axlebox, in order to avoid grease contamination.

In practice, the abutment must be designed with a sufficient mechanical strength to press the bearing unit with a suitable mounting force when the axlebox is mounted on the axle, then to support axial forces coming from curve and switch points when the vehicle is in service. However, an oversized diameter of the abutment would negatively impact the size of the equipment mounted between the two axleboxes. Indeed, the diameter of the equipment, including wheels, gearbox and brakes, must be larger than the centering diameter of the backing device to avoid mechanical interference during assembly.

Thus, the diameter of the backing device is a compromise between the diameter of the bearing unit and the diameter of the equipment. It often results in an optimized design with potential weaknesses, namely surface deformation on the contact interface between the backing device and the axle, stress concentration on certain areas of the axle, insufficient mounting force of the bearing unit due to the deformation risk. Besides, on some axleboxes, equipment and wheels are oversized to allow their mounting on the axle.

U.S. Pat. No. 6,561,559 discloses several examples of backing devices, adapted to equip an axlebox comprising a bearing unit mounted on an axle.

SUMMARY OF THE INVENTION

The aim of the invention is to provide an improved backing device and an improved axlebox.

To this end, the invention concerns a backing device, adapted to equip an axlebox comprising a bearing unit and supporting an axle. According to the invention, the backing device comprises: an inner ring having an inner surface and at least one outer surface; at least one outer ring having an inner surface facing the outer surface of the inner ring; and tightening means inserted inside the inner ring and/or the outer ring and which, when actuated, press the inner surface of the outer ring and the outer surface of the inner ring against each other and narrow the inner surface of the inner ring by elastic deformation thereof.

Thanks to the invention, the backing device can be quickly and easily locked in position on the axle or unlocked from the axle. It is no more compulsory to provide the axle with an abutment for the backing device, so that machining of the axle is simplified. Axial pressure exerted on the inner ring of the backing device is reduced or even suppressed. Diameter of components mounted on the axle behind the backing device can be reduced. Size, weight and costs of the axle are reduced. Besides, the invention offers more possibilities for designing the sealing means positioned between the axlebox housing and the backing device.

According to further aspects of the invention which are advantageous but not compulsory, the backing device may incorporate one or several of the following features:

The inner ring has at least one frustoconical outer surface; the outer ring has a frustoconical inner surface; and the tightening means are inserted inside both the inner ring and the outer ring and, when actuated, press the frustoconical inner surface of the outer ring against the frustoconical outer surface of the inner ring and narrow the inner surface of the inner ring by elastic deformation thereof.

The tightening means comprise at least one screw which extends through a hole formed in a first ring among the inner ring and the outer ring and which has a threaded portion inserted in a threaded bore formed in a second ring among the inner ring and the outer ring; and the tightening means are actuated by tightening the screw or screws.

The inner ring has two frustoconical outer surfaces; the backing device comprises two outer rings each having a frustoconical inner surface; and the tightening means are inserted inside the two outer rings and, when actuated, press the frustoconical inner surfaces of the outer rings against the frustoconical outer surfaces of the inner ring and narrow the inner surface of the inner ring by elastic deformation thereof.

The two frustoconical inner surfaces form an obtuse angle facing the inner ring; the tightening means comprise at least one screw which extends through a hole formed in a first ring among the two outer rings and which has a threaded portion inserted in a threaded bore formed in a second ring among the two outer rings; and the tightening means are actuated by tightening the screw or screws.

The tightening means comprise at least one cavity formed inside the inner ring and a valve inserted inside the inner ring in fluid communication with the cavity; and the tightening means, when actuated by filling the cavity or cavities with a fluid, press the outer surface of the inner ring and the inner surface of the outer ring against each other and narrow the inner surface of the inner ring by elastic deformation thereof.

The invention also concerns an axlebox, adapted to support an axle, wherein the axlebox comprises a bearing unit and a backing device as mentioned here-above.

According to further aspects of the invention which are advantageous but not compulsory, the axlebox may incorporate one or several of the following features:

The inner ring of the backing device has a lateral surface in contact with an inner ring of the bearing unit.

The inner ring of the backing device has a lateral surface in contact with an abutment formed on the axle.

The axlebox comprises a housing which defines a sealing labyrinth with the backing device.

The invention also concerns a vehicle, comprising at least one axlebox as mentioned here-above. In particular, the invention concerns a railway vehicle such as a train. Preferably, the vehicle comprises two axleboxes for each wheelset.

The invention also concerns a method for mounting a backing device on an axle. The backing device is as mentioned here-above and the method comprises the following steps:

a) positioning the backing device on the axle, in particular next to the bearing unit belonging to the axlebox;

b) actuating the tightening means to press the inner surface of the outer ring and the outer surface of the inner ring against each other and to narrow the inner surface of the inner ring elastically deformed on the axle.

According to a particular embodiment, the mounting method comprises a step b1) consisting in tightening the screw(s) to press the inner surface of the outer ring and the outer surface of the inner ring against each other and to narrow the inner surface of the inner ring elastically deformed on the axle.

According to another particular embodiment, the mounting method comprises a step b2) consisting in filling the cavity or cavities with a fluid to press the outer surface of the inner ring and the inner surface of the outer ring against each other and to narrow the inner surface of the inner ring elastically deformed on the axle.

The invention also concerns a method for dismounting a backing device from an axle. The backing device is as mentioned here-above and the method comprises the following steps:

c) loosening the tightening means to release the pressure between the inner surface of the outer ring and the outer surface of the inner ring and to expand the inner surface of the inner ring elastically deformed around the axle;

d) removing the backing device from the axle.

According to a particular embodiment, the dismounting method comprises a step c1) consisting in loosening the screw(s).

According to another particular embodiment, the dismounting method comprises a step c2) consisting in draining the fluid out of the cavity or cavities.

Steps b1) and b2) are particular embodiments of step b), while steps c1) and c2) are particular embodiments of step c).

BRIEF DESCRIPTION OF THE DRAWINGS

The invention will now be explained in correspondence with the annexed figures, and as an illustrative example, without restricting the object of the invention. In the annexed figures:

FIG. 5 is a view at a larger scale of detail V of FIG. 4;

FIG. 6 is a perspective view of the backing device equipping the axlebox of FIGS. 2 to 5;

DETAILED DESCRIPTION OF THE PRESENT INVENTION

Figure 1:
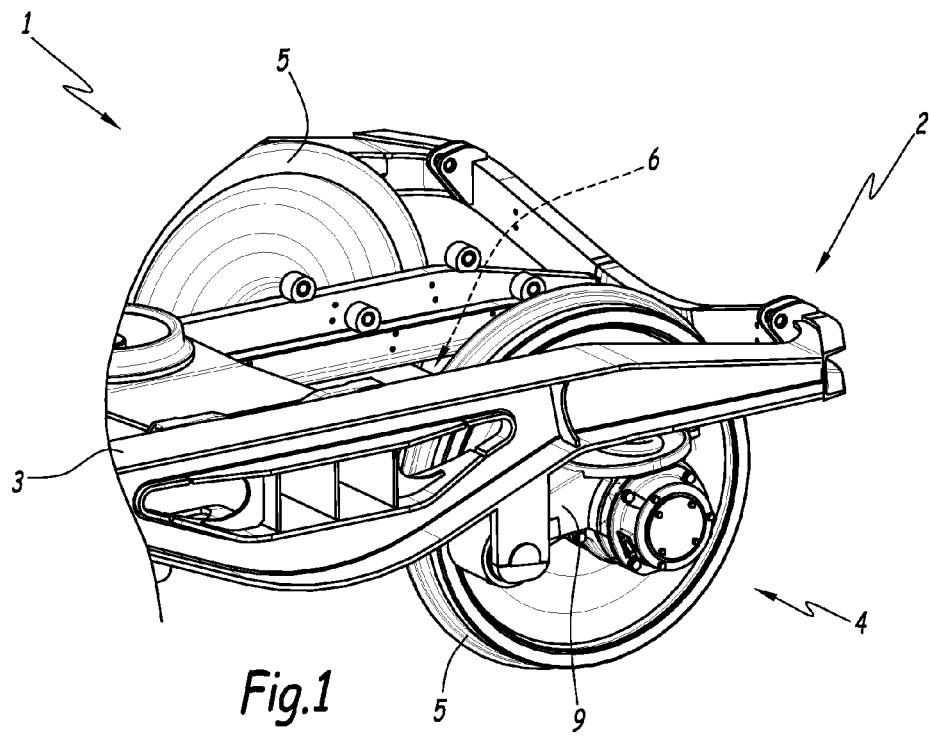
FIG. 1 is a partial perspective view of a bogie belonging to a railway vehicle.

FIG. 1 shows a bogie 2, partly represented for simplification purpose, belonging to a railway vehicle 1. Bogie 2 comprises a frame 3, two wheelset 4 and four axleboxes 9. Only one wheelset 4 and one axlebox 9 are shown on FIG. 1 for simplification purpose. Wheelset 4 comprises two wheels 5 supported by an axle 6, which is hidden by frame 3 and one of the wheels 5. Axlebox 9 is mounted on the outer side of the wheel 5 and secured to frame 3. FIG. 1 explains the context of the application but does not show the invention.

Figure 2:
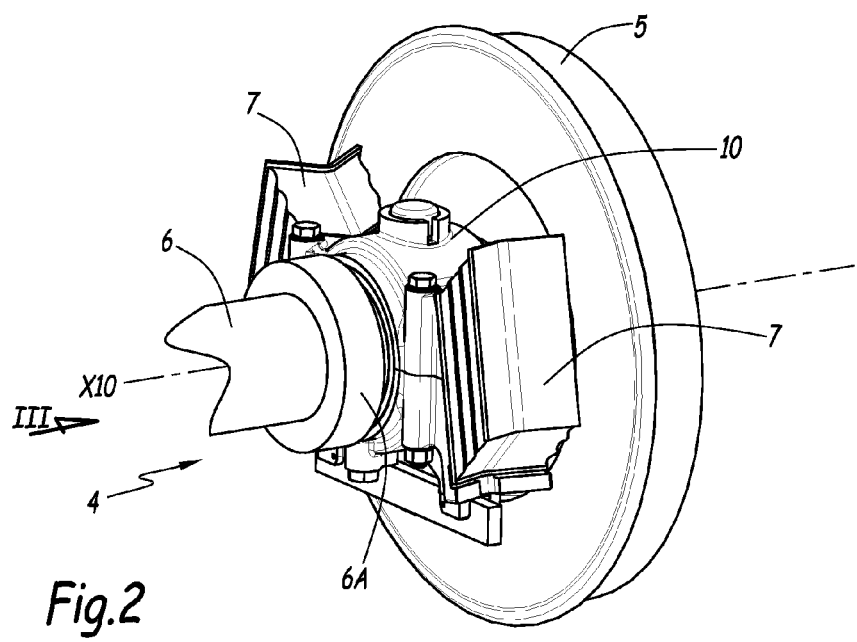
FIG. 2 is another perspective view, with another angle, showing an axlebox according to the invention, belonging to a railway vehicle also according to the invention, the axlebox supporting an axle and a wheel.
Figure 3:
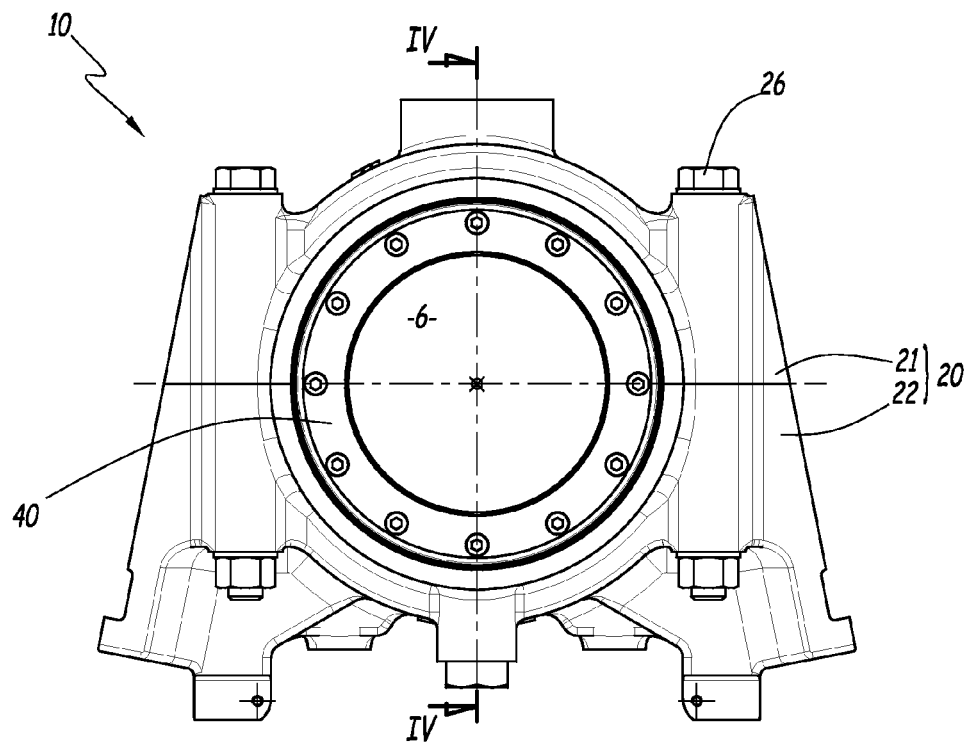
FIG. 3 is a side view of the axlebox along arrow III of FIG. 2, the wheel being not shown for simplification purpose.
Figure 4:
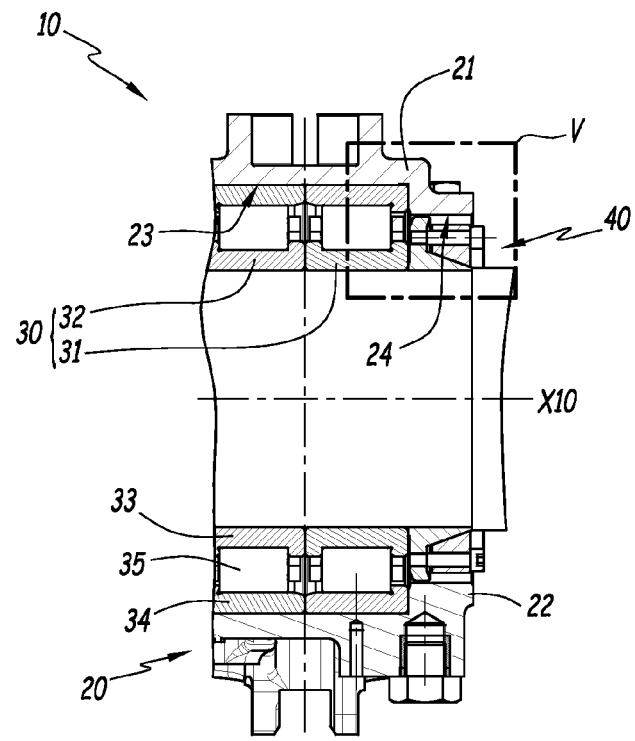
FIG. 4 is a sectional view along line IV-IV on FIG. 3, the axlebox comprising a housing, a bearing unit and a backing device according to the invention, the axlebox being partly shown for simplification purpose.

FIG. 2 shows a wheelset 4, a wheel 5, an axle 6 and suspension systems 7, together with an axlebox 10 according to the invention. Thus, axlebox 10 is different from axlebox 9 shown on FIG. 1. Suspension systems 7 connect axlebox 10 to the frame, not shown, of a vehicle which is also according to the invention. Axlebox 10 is mounted on axle 6 on the inner side of the wheel 5. Axlebox 10 supports axle 6, which supports wheels 5. Wheels 5, axle 6 and axlebox box 10 are centered on a central axis X10.

FIGS. 3 to 6 show axlebox 10, which comprises a housing 20, a bearing unit 30 and a backing device 40 according to the invention.

Housing 20 comprises an upper part 21 and a lower part 22. Housing 20 defines a cavity 23 receiving bearing unit 30 and a cavity 24 receiving backing device 40. Cavities 23 and 24 are centered on axis X10. Axlebox 10 comprises bolts 26 for fastening parts 21 and 22 together, once bearing unit 30 is mounted inside cavity 23.

Bearing unit 30 comprises two rolling bearings 31 and 32 mounted against each other on axle 6. Bearings 31 and 32 are centered on axis X10. Each bearing 31 and 32 comprises an inner ring 33 mounted on axle 6, an outer ring 34 fitted in cavity 23 of housing 20, and rolling elements 35 mounted between inner ring 33 and outer ring 34. Alternatively, bearing unit 30 may comprise a single bearing 31 or 32, of any type adapted to the present application.

Backing device 40 is mounted on axle 6 and inside cavity 24 next to bearing unit 30 to prevent movement of bearing unit 30 along axle 6. Backing device 40 has an annular shape, as shown on FIG. 6. In other words, backing device 40 forms a backing device for bearing unit 30. Backing device 40 comprises an inner ring 50, an outer ring 60 and tightening means 80. Rings 50 and 60 are centered on axis X10.

Inner ring 50 has a cylindrical inner surface 51, a frusto-conical outer surface 52 and two lateral surfaces 54 and 55. Lateral surface 55 is positioned in contact with an inner ring 33 of bearing unit 30, while lateral surface 54 is preferably positioned in contact with an abutment 6A formed on axle 6. Abutment 6A has an annular shape centered on axis X10. Diameter of abutment 6A is reduced in comparison with known wheel sets provided with a backing device. Moreover, abutment 6A is optional. Inner ring 50 also has a flange 56 extending radially to axis X10, from between outer surface 52 and lateral surface 55. Flange 56 is traversed from side to side by twelve threaded bores 58 regularly distributed around axis X10, each bore 58 extending along a direction parallel to axis X10.

Outer ring 60 has a cylindrical outer surface 61, a frusto-conical inner surface 62 and two lateral surfaces 64 and 65. Inner surface 62 of outer ring 60 is positioned against surface 52 of inner ring 50. Outer ring 60 is traversed from side to side, between lateral surfaces 64 and 65, by twelve cylindrical bores 68 regularly distributed around axis X10, each bore 68 extending along a direction parallel to axis X10.

The tightening means 80 comprise twelve screws 81 positioned in bores 58 and 68, aligned to receive the screws 81. Each screw 81 comprises a head 82 and a body 83 having a threaded end portion 84. Head 82 is positioned against surface 64 of ring 60, body 83 extends through bore 68 and threaded portion 84 is inserted in threaded bore 58. When actuated by tightening the screws 81, the tightening means 80 press surface 62 of ring 60 against surface 52 of ring 50. Ring 50 is compressed and elastically deformed between axle 6, ring 31 of bearing unit 30 and outer ring 60. In particular, surface 51 of ring 50 is narrowed or tightened around axle 6. Thus, a rigid connection is formed between axle 6 and backing device 40.

Thanks to the invention, backing device 40 can be quickly and easily mounted on the axle or dismounted from the axle. In practice, backing device 40 comprises self-locking means. More precisely, backing device 40 comprises means 52, 58, 62, 64, 68, 80 for narrowing inner surface 51 of ring 50 on axle 6.

Sealing means, not shown, are preferably provided between backing device 40 and housing 20, more precisely between flange 56 and cavity 24. For example, such sealing means may comprise a rubber seal, a felt strip or any other dynamic seal adapted to the present application.

The invention also concerns a method for mounting backing device 40 on axle 6 and a method for dismounting backing device 40 from axle 6.

The mounting method comprises a step a) of positioning backing device 40 on axle 6, in particular next to bearing unit 30, then a step b1) of tightening the screws 81, so that inner surface 62 of ring 60 and outer surface 52 of ring 50 are pressed against each other and that inner surface 51 of ring 50 is narrowed around axle 6.

The dismounting method comprises a step c1) of loosening the screws 81, so that the pressure between inner surface 62 of ring 60 and outer surface 52 of ring 50 is released and that inner surface 51 of ring 50 expands around axle 6, then a step d) of removing backing unit 10 from axle 6.

Thus, backing device 40 and axlebox 10 can be quickly and easily mounted or dismounted from axle 6.

Figure 7:
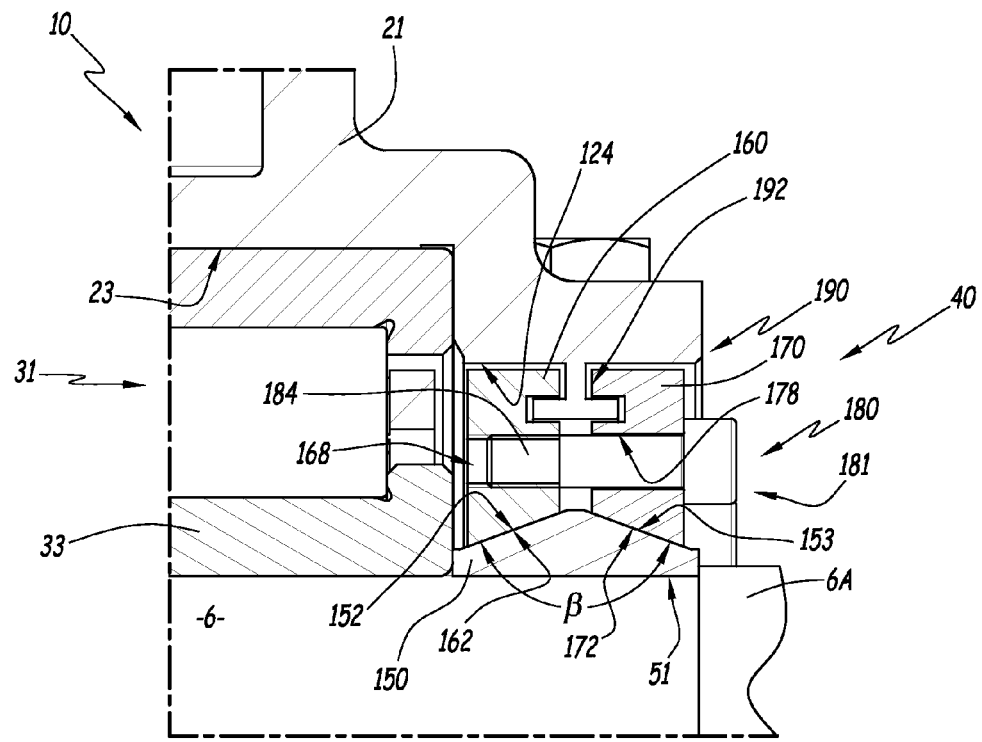
FIGS. 7 and 8 are views similar to FIGS. 5 and 6, respectively, showing an axlebox according to a second embodiment of the invention.
Figure 8:
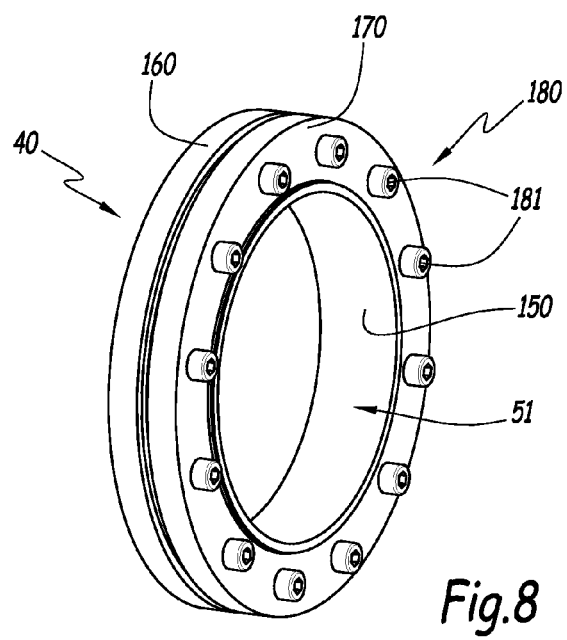

FIGS. 7 and 8 show a second embodiment of the invention. Elements similar to the first embodiment have the same references, while elements different from the first embodiment have references augmented by 100 and are described hereafter. The mounting and dismounting methods described hereabove for the first embodiment also apply to the second embodiment.

In the second embodiment, bearing device 40 comprises an inner ring 150, two outer rings 160 and 170, tightening means 180 and sealing means 190. Inner ring 150 has two frusto-conical outer surfaces 152 and 153. Outer rings 160 and 170 each have a frustoconical inner surface, respectively 162 and 172, which form an obtuse angle β facing inner ring 150. Inner surfaces 162 and 172 are positioned against surfaces 152 and 153, respectively. The sealing means 190 comprise a labyrinth 192 defined between cavity 124 of housing 20 and outer rings 160 and 170, in order to provide dynamic sealing and avoid intrusion of external elements inside the axlebox.

The tightening means 180 comprise twelve screws 181, each extending through a hole 178 formed in outer ring 170 and having a threaded portion 184 inserted in a threaded bore 168 formed in outer ring 160. When actuated by tightening the screws 181, the tightening means 180 press surface 162 against surface 152 and surface 163 against surface 153. Ring 150 is compressed and elastically deformed between axle 6, ring 31 of bearing unit 30, outer rings 160 and 170. In particular, surface 51 of ring 150 is narrowed or tightened around axle 6. Thus, a rigid connection is formed between axle 6 and backing device 40.

Figure 9:
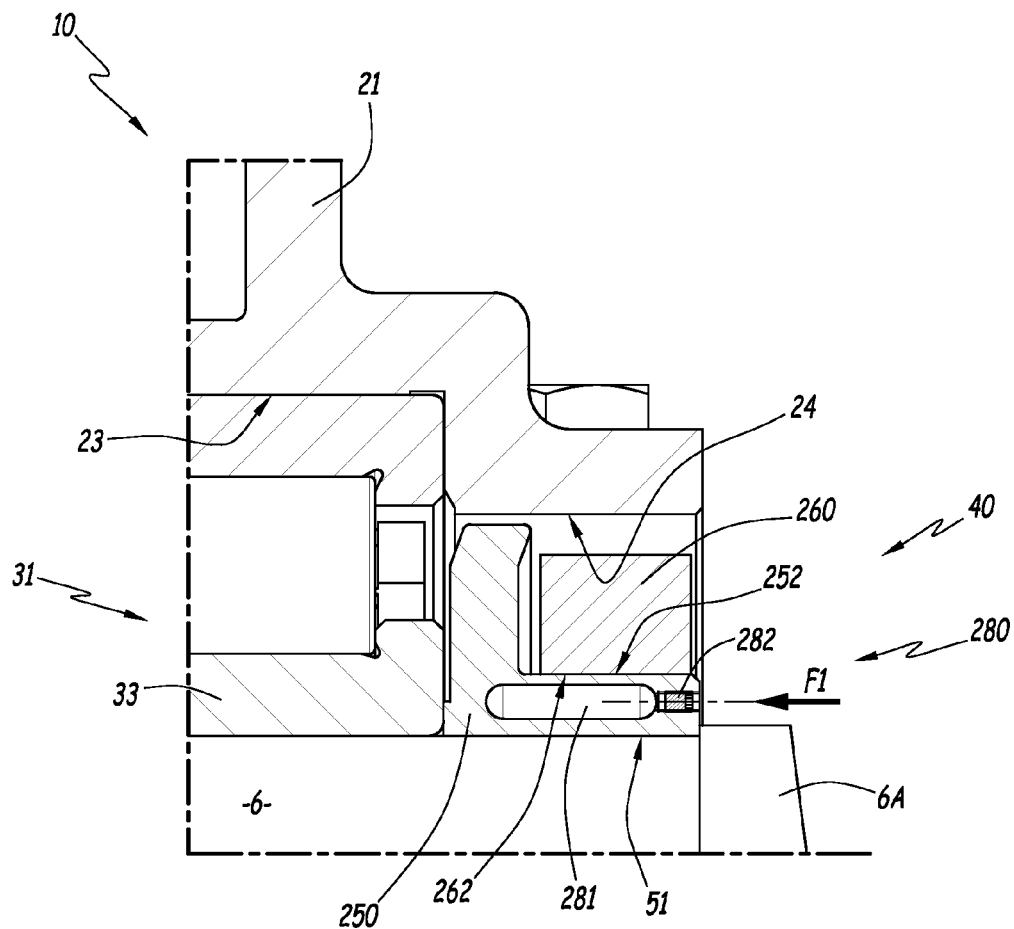
FIG. 9 is a sectional view similar to FIGS. 5 and 7, showing an axlebox according to a third embodiment of the invention.

FIG. 9 shows a third embodiment of the invention. Elements similar to the first embodiment have the same references, while elements different from the first embodiment have references augmented by 200 and are described hereafter.

In the third embodiment, bearing device 40 comprises an inner ring 250, an outer ring 260 and tightening means 280. Inner ring 250 comprises a cylindrical outer surface 252, while outer ring 262 comprises a cylindrical inner surface 262.

The tightening means 280 comprise one or several cavities 281 formed inside inner ring 250, distributed around axis X10. For each cavity 281, the tightening means 280 also comprise a valve 282 inserted inside the inner ring 250, in fluid communication with the cavity 281. A fluid flow is represented by an arrow F1 on FIG. 9. When actuated by filling the cavity or cavities 281 with pressurized fluid F1, each cavity 281 is expanded, the tightening means 280 press outer surface 252 and inner surface 262 against each other and narrow inner surface 51 of inner ring 250 by elastic deformation thereof. Fluid F1 is preferably a hydraulic fluid.

For the embodiment of FIG. 9, the mounting method comprises a step b2) of filling the cavity or cavities 281 with fluid F1, so that each cavity is expanded, that outer surface 252 and inner surface 262 are pressed against each other and that inner surface 51 of inner ring 250 is narrowed around axle 6. The dismounting method comprises a step c2) of draining fluid F1 out the cavity or cavities 281, so that each cavity 281 shrinks and retrieves its initial volume, that the pressure between inner surface 262 and outer surface 252 is released and that inner surface 51 of ring 250 expands around axle 6. Thus, backing device 40 and axlebox 10 can be quickly and easily mounted or dismounted from axle 6.

Whatever the embodiment, the backing device 40 comprises: an inner ring 50, 150, 250 having an inner surface 51 and at least one outer surface 52, 152, 153, 252; at least one outer ring 60, 160, 170, 260 having an inner surface 62, 162, 172, 262 facing the outer surface 52, 152, 153, 252 of the inner ring 50, 150, 250; and tightening means 80, 180, 280 inserted inside the inner ring and/or the outer ring and which, when actuated, press the inner surface 62, 162, 172, 262 of the outer ring 60, 160, 170, 260 and the outer surface 52, 152, 153, 252 of the inner ring 50, 150, 250 against each other and narrow the inner surface 51 of the inner ring 50, 150, 250 by elastic deformation thereof.

Other non-shown embodiments of axlebox 10 and/or bearing device 40 can be implemented within the scope of the invention. In particular, axlebox housing 20, bearing unit 30, inner ring 50, 150, 250, outer ring(s) 60, 160, 170, 260, tightening means 80, 180, 280 and sealing means 190 may have different configurations.

In addition, technical features of the different embodiments can be, in whole or part, combined with each other. Thus, axlebox 10 and backing device 40 can be adapted to the specific requirements of the application.

The invention claimed is:

1. A backing device, adapted to equip an axlebox which includes a bearing unit and supporting an axle, the backing device comprising:
   an inner ring having an inner surface and at least one outer surface;
   at least one outer ring having an inner surface facing the outer surface of the inner ring; and
   a tightening component inserted inside at least one of the inner ring and the outer ring and which, when actuated, presses the inner surface of the outer ring and the outer surface of the inner ring against each other and narrow the inner surface of the inner ring by elastic deformation thereof.

2. The backing device according to claim 1, wherein:
   the inner ring has at least one frustoconical outer surface;
   the outer ring has a frustoconical inner surface; and
   the tightening component is inserted inside both the inner ring and the outer ring and, when actuated, press the frustoconical inner surface of the outer ring against the frustoconical outer surface of the inner ring and narrow the inner surface of the inner ring by elastic deformation thereof.

3. The backing device according to claim 2, wherein the tightening component comprises at least one screw, wherein the at least one screw extends through a hole formed in a first ring among the inner ring and the outer ring and, which has a threaded portion inserted in a threaded bore formed in a second ring among the inner ring and the outer ring; and wherein the tightening component is actuated by tightening the at least one screw.

4. The backing device according to claim 1, wherein:
   the inner ring has two frustoconical outer surfaces;
   the backing device comprises two outer rings, each outer ring having a frustoconical inner surface; and
   the tightening component is inserted inside the two outer rings and, when actuated, presses the frustoconical inner surfaces of the outer rings against the frustoconical outer surfaces of the inner ring and narrow the inner surface of the inner ring by elastic deformation thereof.

5. The backing device according to claim 4, wherein the two frustoconical inner surfaces form an obtuse angle facing the inner ring;
   wherein the tightening component comprises at least one screw which extends through a hole formed in a first ring among the two outer rings and which has a threaded portion inserted in a threaded bore formed in a second ring among the two outer rings; and wherein the tightening component is actuated by tightening the at least one screw.

6. The backing device according to claim 1, wherein the tightening component comprises at least one cavity formed inside the inner ring and a valve inserted inside the inner ring in fluid communication with the cavity; and
   wherein the tightening component, when actuated by filling the at least one cavity with a fluid, presses the outer surface of the inner ring and the inner surface of the outer ring against each other and narrow the inner surface of the inner ring by elastic deformation thereof.

7. An axlebox, comprising:
   a bearing unit and a backing device including:
      an inner ring having an inner surface and at least one outer surface;
      at least one outer ring having an inner surface facing the outer surface of the inner ring; and
      a tightening component inserted inside at least one of the inner ring and the outer ring and which, when actuated, presses the inner surface of the outer ring and the outer surface of the inner ring against each other and narrow the inner surface of the inner ring by elastic deformation thereof,
   wherein the bearing unit and a backing device are adapted to support an axle.

8. The axlebox according to claim 7, wherein the inner ring of the backing device has a lateral surface in contact with an inner ring of the bearing unit.

9. The axlebox according to claim 7, wherein the inner ring of the backing device has a lateral surface in contact with an abutment formed on the axle.

10. The axlebox according to claim 7, further comprising a housing which defines a sealing labyrinth with the backing device.

11. The axlebox according to claim 7, wherein the axlebox is installed into a vehicle.

12. A method for mounting a backing device on an axle, the method comprises steps of:
   a) obtaining the backing device, the backing device comprising:
      an inner ring having an inner surface and at least one outer surface;
      at least one outer ring having an inner surface facing the outer surface of the inner ring; and
      a tightening component inserted inside at least one of the inner ring and the outer ring and which, when actuated, presses the inner surface of the outer ring and the outer surface of the inner ring against each other and narrow the inner surface of the inner ring by elastic deformation thereof;
   b) positioning the backing device on the axle, wherein the backing device is located next to the bearing unit belonging to the axlebox;
   c) actuating the tightening component to press the inner surface of the outer ring and the outer surface of the inner ring against each other and to narrow the inner surface of the inner ring elastically deformed on the axle.

13. The method for mounting a backing device on an axle according to claim 12, wherein the wherein the tightening component comprises at least one screw, wherein the at least one screw extends through a hole formed in a first ring among the inner ring and the outer ring and, which has a threaded portion inserted in a threaded bore formed in a second ring among the inner ring and the outer ring, wherein the step of actuating the tightening component includes a step of:
   d) tightening each at least one screw to press the inner surface of the outer ring and the outer surface of the inner ring against each other and to narrow the inner surface of the inner ring elastically deformed on the axle.

14. The method for mounting a backing device on an axle according to claim 12, wherein the tightening component comprises at least one cavity formed inside the inner ring and a valve inserted inside the inner ring in fluid communication with the cavity, wherein the step of actuating the tightening component includes a step of:
   d) filling the cavity or cavities with a fluid to press the outer surface of the inner ring and the inner surface of the outer ring against each other and to narrow the inner surface of the inner ring elastically deformed on the axle.

15. A method for dismounting a backing device from an axle, the method comprising steps of:

a) accessing an axle comprising having a backing device assembled thereto, wherein the backing device includes:
   an inner ring having an inner surface and at least one outer surface,
   at least one outer ring having an inner surface facing the outer surface of the inner ring, and
   a tightening component inserted inside at least one of the inner ring and the outer ring and which, when actuated, presses the inner surface of the outer ring and the outer surface of the inner ring against each other and narrow the inner surface of the inner ring by elastic deformation thereof;
b) loosening the tightening component to release the pressure between the inner surface of the outer ring and the outer surface of the inner ring and to expand the inner surface of the inner ring elastically deformed around the axle;
c) removing the backing device from the axle.

* * * * *